US009093045B2

(12) United States Patent
Lee

(10) Patent No.: US 9,093,045 B2
(45) Date of Patent: Jul. 28, 2015

(54) LIQUID CRYSTAL DISPLAY DEVICE AND METHOD FOR DRIVING THE SAME

(71) Applicant: LG Display Co., Ltd., Seoul (KR)

(72) Inventor: Ju-Young Lee, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 149 days.

(21) Appl. No.: 14/018,184

(22) Filed: Sep. 4, 2013

(65) Prior Publication Data

US 2014/0111491 A1 Apr. 24, 2014

(30) Foreign Application Priority Data

Oct. 24, 2012 (KR) .......................... 10-2012-0118359

(51) Int. Cl.
*G09G 3/36* (2006.01)
*G02F 1/1362* (2006.01)

(52) U.S. Cl.
CPC .......... *G09G 3/3688* (2013.01); *G02F 1/13624* (2013.01); *G09G 3/3659* (2013.01); *G02F 1/136213* (2013.01); *G09G 2300/0852* (2013.01); *G09G 2330/045* (2013.01)

(58) Field of Classification Search
CPC . G09G 3/3648; G09G 3/3659; G09G 3/3688; G09G 2300/0842
See application file for complete search history.

(56) References Cited

U.S. PATENT DOCUMENTS

| 2009/0096947 | A1* | 4/2009 | Teranishi et al. ................ 349/38 |
| 2009/0135358 | A1* | 5/2009 | Jung et al. ...................... 349/139 |
| 2009/0207330 | A1* | 8/2009 | Jung et al. ........................ 349/39 |

* cited by examiner

*Primary Examiner* — Kevin Nguyen
(74) *Attorney, Agent, or Firm* — Fenwick & West LLP

(57) ABSTRACT

A liquid crystal display device includes a first switching element for supplying a data voltage to a pixel electrode during a first period, a second switching element for supplying a common voltage to an auxiliary electrode during the first period, a third switching element for supplying the data voltage to the auxiliary electrode during a second period subsequent to the first period, a common electrode to which the common voltage is supplied, a liquid crystal capacitor coupled between the pixel electrode and the common electrode, and a storage capacitor coupled between the pixel electrode and the auxiliary electrode. The voltage at the auxiliary electrode changes from the common voltage during the first period to the data voltage during the second period, and a voltage at the pixel electrode changes from the data voltage during the first period to an amplified data voltage during the second period.

9 Claims, 5 Drawing Sheets

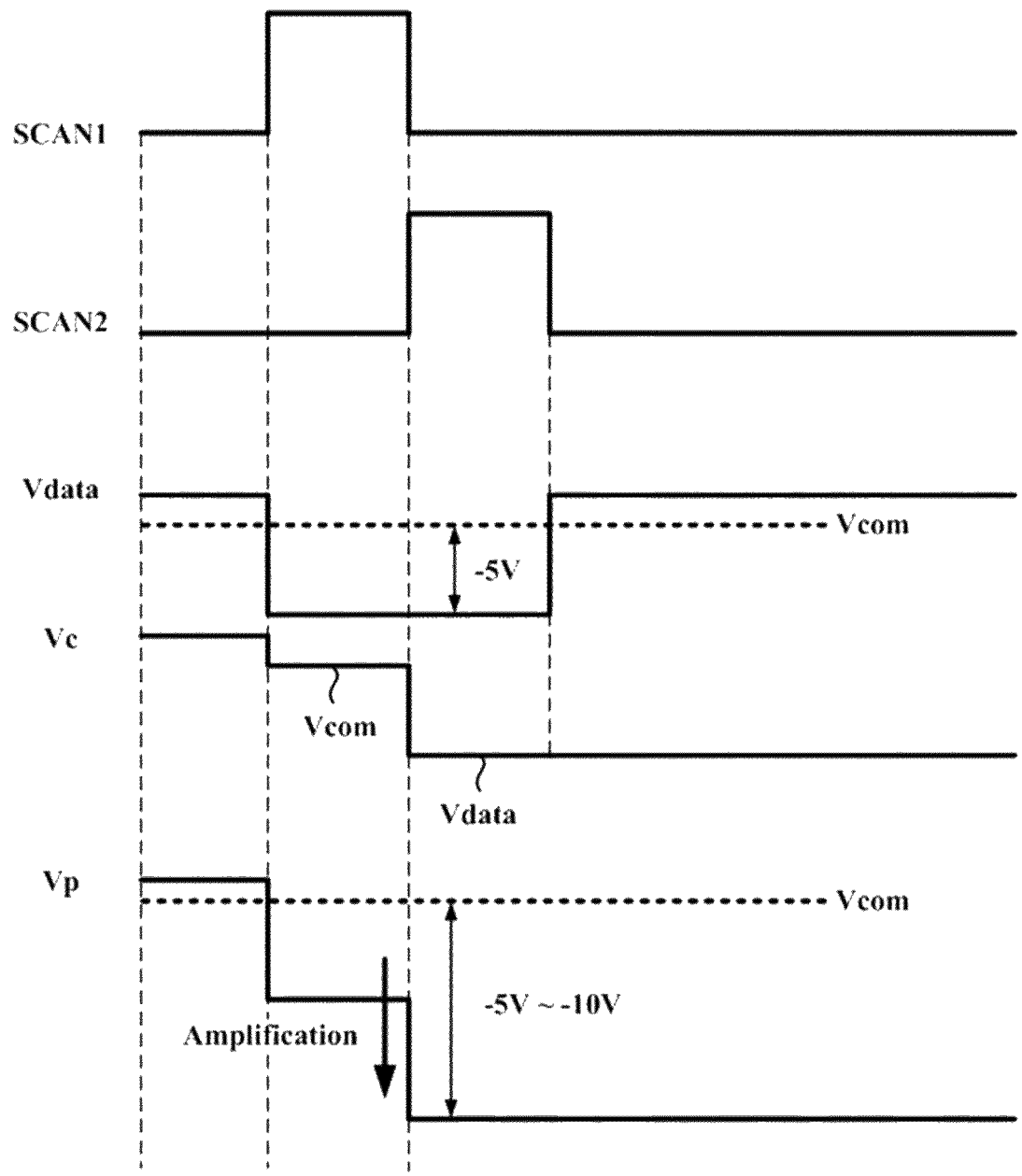

LIQUID CRYSTAL DISPLAY DEVICE AND METHOD FOR DRIVING THE SAME

CROSS-REFERENCE TO RELATED APPLICATION

This application claims the benefit of priority of Korean Patent Application No. 10-2012-0118359, filed on Oct. 24, 2012, which is hereby incorporated by reference as if fully set forth herein.

BACKGROUND OF THE INVENTION

1. Field of the Invention

The present invention relates to a liquid crystal display device and a method for driving the same.

2. Discussion of the Related Art

Typically, liquid crystal display (LCD) devices display an image by controlling light transmittance of liquid crystal having dielectric anisotropy using an electric field. For this function, such an LCD device includes a liquid crystal panel including liquid crystal cells arranged in the form of a matrix, and a driving circuit for driving the liquid crystal panel.

The liquid crystal panel defines the liquid crystal cells through intersection of a plurality of gate lines and a plurality of data lines. The liquid crystal cells receive data voltages from corresponding ones of the data lines in response to scan signals supplied from corresponding ones of the gate lines, respectively. Each liquid crystal cell adjusts light transmittance of a liquid crystal thereof in accordance with the data voltage supplied to the liquid crystal cell, to display an image.

The driving circuit includes a gate driver for sequentially supplying scan signals to respective gate lines of the liquid crystal panel, a data driver for supplying data voltages to respective data lines of the liquid crystal panel, and a timing controller for controlling driving timings of the gate driver and data driver.

The recent trend of such an LCD device is toward enlargement and high resolution. As a result, such an LCD device requires increased power consumption. In particular, the data driver requires great power consumption, and generates a large amount of heat because data voltages generated from the data driver swing within a wide range, and the driving frequency of the data driver is high.

SUMMARY OF THE INVENTION

Accordingly, embodiments of the present invention are directed to a liquid crystal display device and a method for driving the liquid crystal display device that obviate one or more problems due to limitations and disadvantages of the related art.

An object of the present invention is to provide a liquid crystal display device and a method for driving the same, which are capable of reducing power consumption of a data driver.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by any combination of the structures described in the written description and claims hereof as well as the appended drawings.

In one aspect, a liquid crystal display device includes a first switching element for supplying a data voltage supplied from a data line to a pixel electrode in response to a first scan signal applied to a first gate line during a first period, a second switching element for supplying a common voltage supplied from a common line to an auxiliary electrode in response to the first scan signal during the first period, a third switching element for supplying the data voltage supplied from the data line to the auxiliary electrode in response to a second scan signal applied to a second gate line during a second period subsequent to the first period, a common electrode to which the common voltage from the common line is applied, a liquid crystal capacitor coupled between the pixel electrode and the common electrode, and a first storage capacitor coupled between the pixel electrode and the auxiliary electrode, wherein a voltage at the auxiliary electrode changes from the common voltage during the first period to the data voltage during the second period, and a voltage at the pixel electrode changes from the data voltage during the first period to an amplified data voltage higher than the data voltage during the second period in accordance with a capacitance ratio between the liquid crystal capacitor and the first storage capacitor.

In one embodiment, the common electrode may establish a vertical electric field, together with the pixel electrode.

In another embodiment, the common electrode may establish a horizontal electric field, together with the pixel electrode.

The pixel electrode and the auxiliary electrode may overlap with each other via an insulating layer interposed between the pixel electrode and the auxiliary electrode, to form the first storage capacitor.

The liquid crystal display device may further include a second storage capacitor coupled between the common electrode and the auxiliary electrode. The second storage capacitor may stabilize the data voltage applied to the auxiliary electrode from the second period to the end of one frame period. The common line and the auxiliary electrode may overlap with each other via an insulating layer interposed between the common line and the auxiliary electrode, to form the second storage capacitor.

The auxiliary electrode may be formed on a layer on which the data line is formed, using a material identical to a material of the data line.

In another aspect, a method for driving a liquid crystal display device includes applying a common voltage supplied from a common line to an auxiliary electrode during a first period in response to a first scan signal applied to the first gate line, supplying a data voltage supplied from a data line to a pixel electrode during the first period, and supplying the data voltage supplied from the data line to the auxiliary electrode during a second period subsequent to the first period in response to a second scan signal applied to a second gate line. The voltage at the pixel electrode changes from the data voltage during the first period to an amplified data voltage higher than the data voltage during the second period in accordance with a capacitance ratio between a liquid crystal capacitor and a first storage capacitor. The liquid crystal capacitor is coupled between the pixel electrode and the common electrode, and the first storage capacitor is coupled between the pixel electrode and the auxiliary electrode.

The method may further include stabilizing the data voltage applied to the auxiliary electrode from the second period to end of one frame period, using a second storage capacitor coupled between the common electrode and the auxiliary electrode.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and along with the description serve to explain the principle of the invention. In the drawings:

FIGS. 4A and 4B are driving waveform diagrams for the pixel P illustrated in FIGS. 2 and 3.

DETAILED DESCRIPTION OF THE INVENTION

Reference will now be made in detail to the exemplary embodiments of the present invention, examples of which are illustrated in the accompanying drawings. Wherever possible, the same reference numbers will be used throughout the drawings to refer to the same or like parts.

Figure 1:
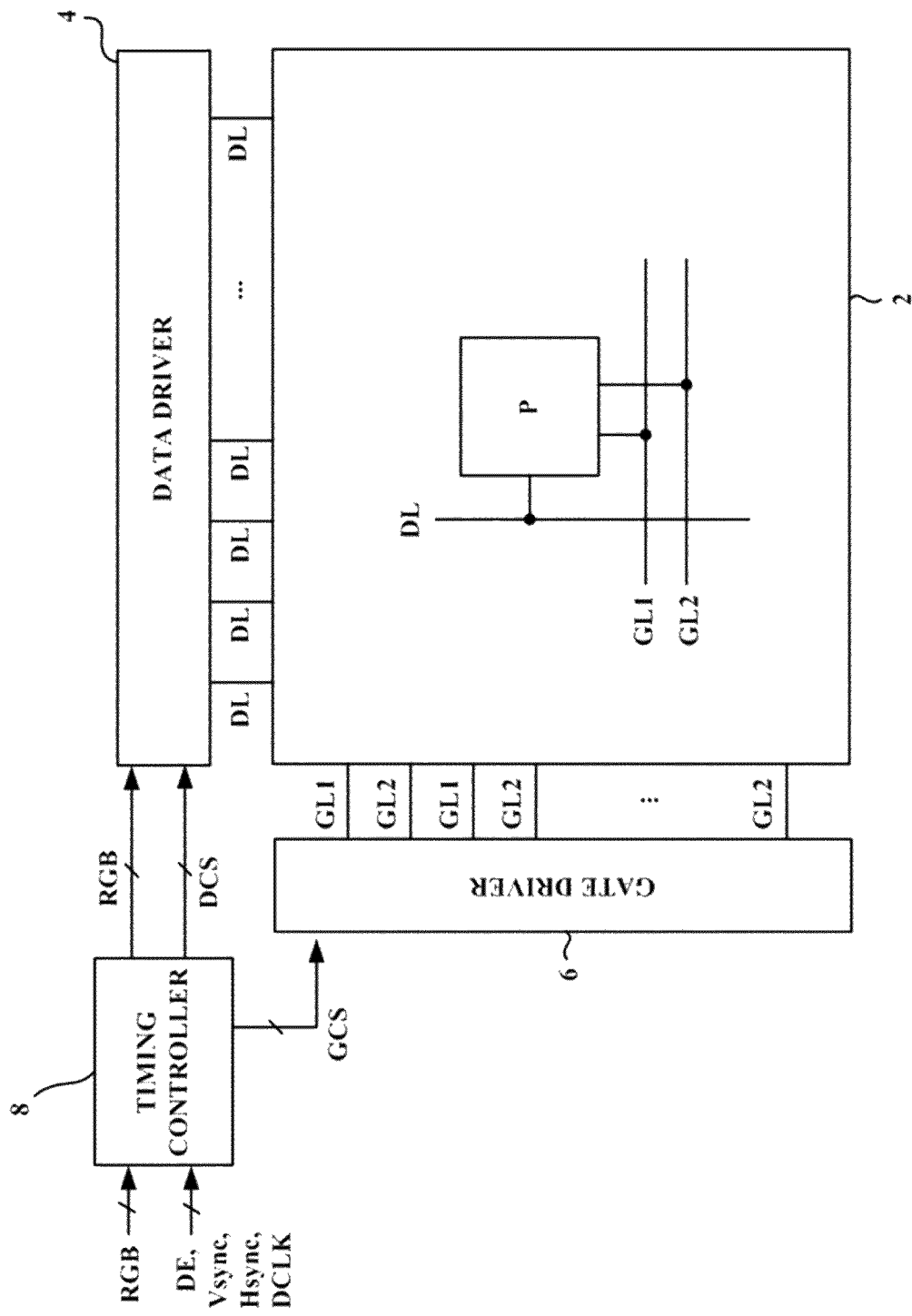
FIG. 1 is a block diagram illustrating a configuration of a liquid crystal display device according to an exemplary embodiment of the present invention.

FIG. 1 is a block diagram illustrating a configuration of a liquid crystal display device according to an exemplary embodiment of the present invention.

The liquid crystal display device illustrated in FIG. 1 includes a liquid crystal panel 2 including pixels P defined by intersections of a plurality of gate lines GL1 and GL2 and a plurality of data lines DL, a gate driver 6 for sequentially supplying scan signals to the gate lines GL1 and GL2, respectively, and a data driver 4 for supplying data voltages to the data lines DL, respectively. The liquid crystal display device also includes a timing controller 8 for generating a data control signal DSC and supplying the data control signal DSC to the data driver 4 to control the data driver 4, while generating a gate control signal GCS and supplying the gate control signal GCS to the gate driver 6 to control the gate driver 6.

Figure 2:
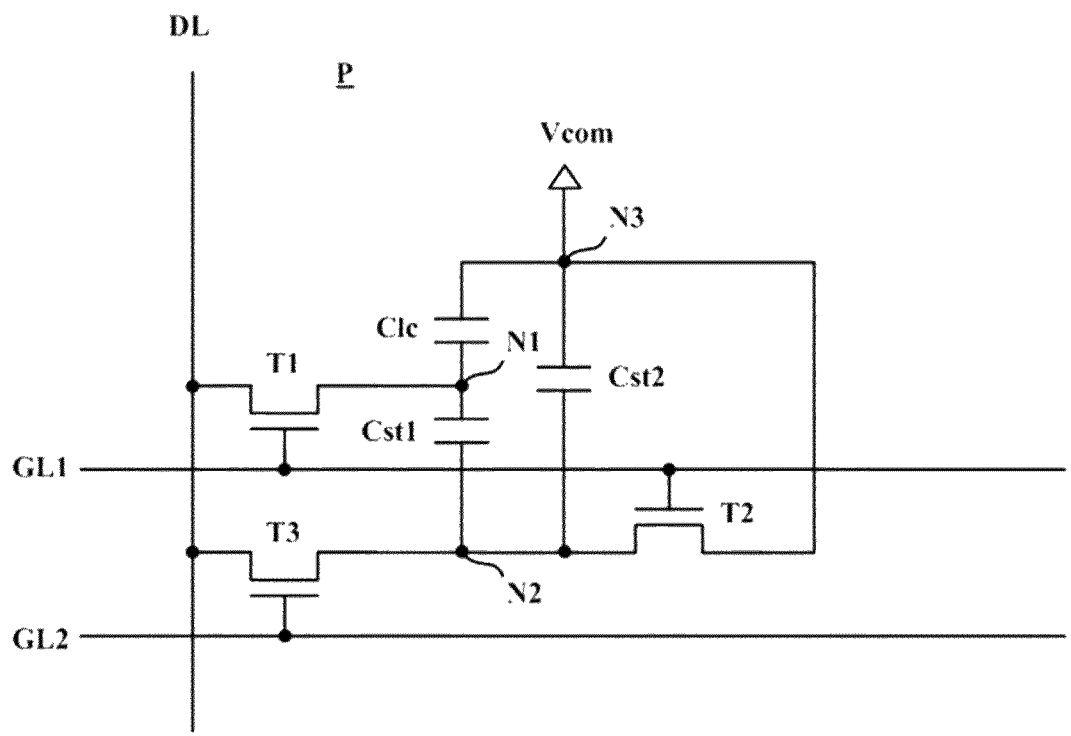
FIG. 2 illustrates a pixel P according to the exemplary embodiment.
Figure 3:
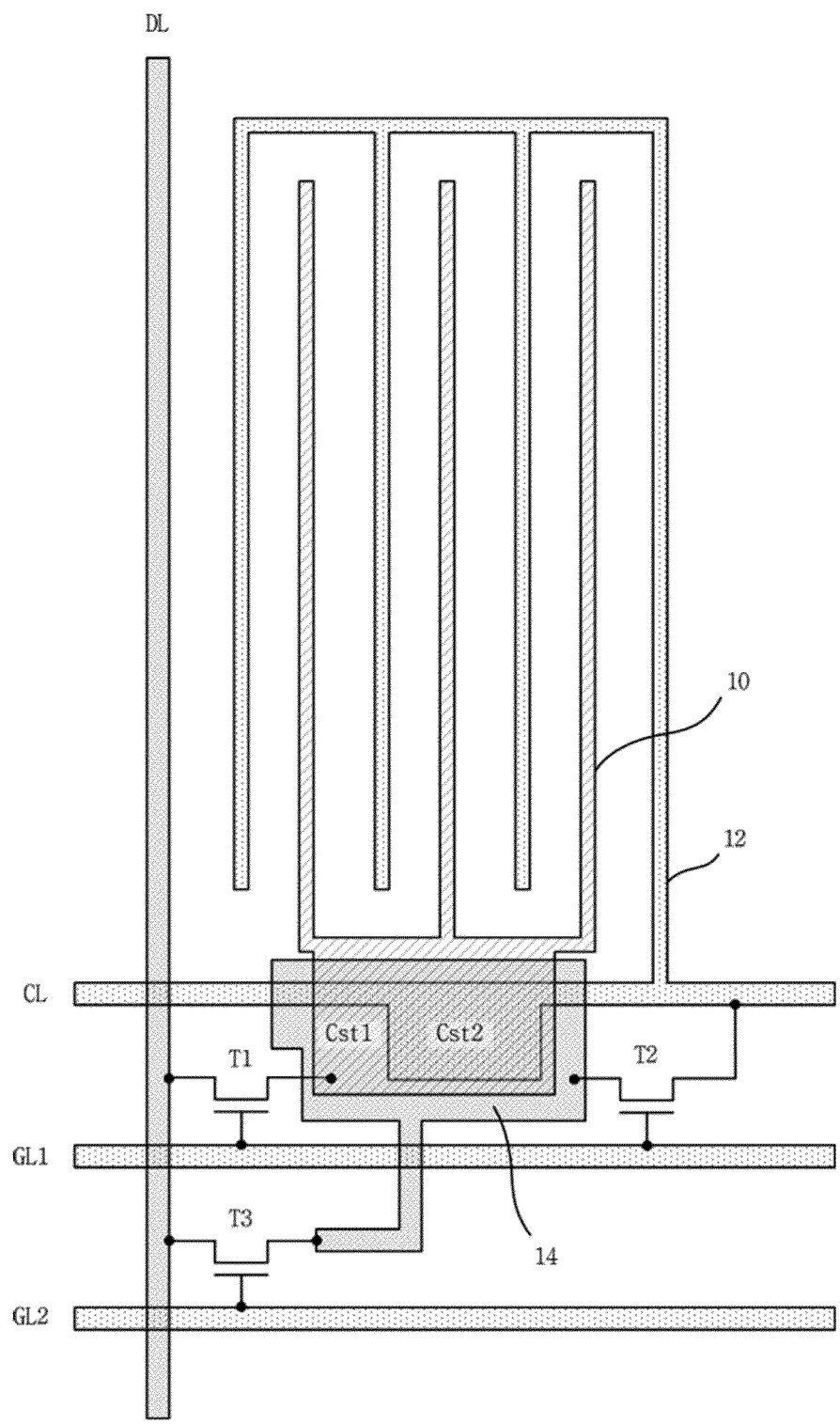
FIG. 3 is an equivalent circuit diagram of the pixel P illustrated in FIG. 2.

In the illustrated embodiment, each pixel P is connected to two gate lines GL1 and GL2 while being connected to one data line DL. As illustrated in FIGS. 2 and 3, each pixel P includes three thin film transistors (TFTs) T1 to T3, two storage capacitors Cst1 and Cst2, and an auxiliary electrode 14. In accordance with such a configuration, the pixel P is characterized in that the voltage of the auxiliary electrode 14 is varied from a common voltage Vcom to a data voltage Vdata, to enable the data voltage Vdata, which has been floated after being supplied to the pixel electrode 10, to be amplified in accordance with the capacitance ratio between a liquid crystal capacitor Clc and the storage capacitor Cst1. The configuration of each pixel P and a method for driving the same will be described later in detail with reference to FIGS. 2 and 3.

More specifically, the liquid crystal panel 2 includes a plurality of first gate lines GL1, a plurality of second gate lines GL2, and data lines DL intersecting the first and second gate lines GL1 and GL2. The liquid crystal panel 2 defines a plurality of pixels P through intersection of the first and second gate lines GL1 and GL2 and the data lines DL. Thus, the pixels P are arranged in the form of a matrix. The first gate lines GL1 may be odd-numbered gate lines, whereas the second gate lines GL2 may be even-numbered gate lines, or vice versa. A first scan signal SCAN1 is applied to the first gate lines GL1 during a first period, whereas a second scan signal SCAN2 is applied to the second gate lines GL2 during a second period subsequent to the first period. Meanwhile, each pixel P includes a combination of R, G, and B sub-pixels or a combination of R, G, B, and W sub-pixels, to render desired color. Each sub-pixel controls light transmittance of a liquid crystal in accordance with data voltage Vdata applied thereto.

Meanwhile, each TFT in each pixel of the liquid crystal panel 2 includes a semiconductor layer made of a silicon semiconductor material such as amorphous silicon (a-Si) or low temperature polysilicon (LIPS), or an oxide semiconductor material. In particular, LIPS has an advantage of excellent operation characteristics, as compared to a-Si.

The gate driver 6 operates, based on the gate control signal GCS supplied from the timing controller 8. The gate driver 6 alternately supplies the first and second scan signals SCAN1 and SCAN2 to the first and second gate lines GL1 and GL2 in a sequential manner.

Figure 4A:
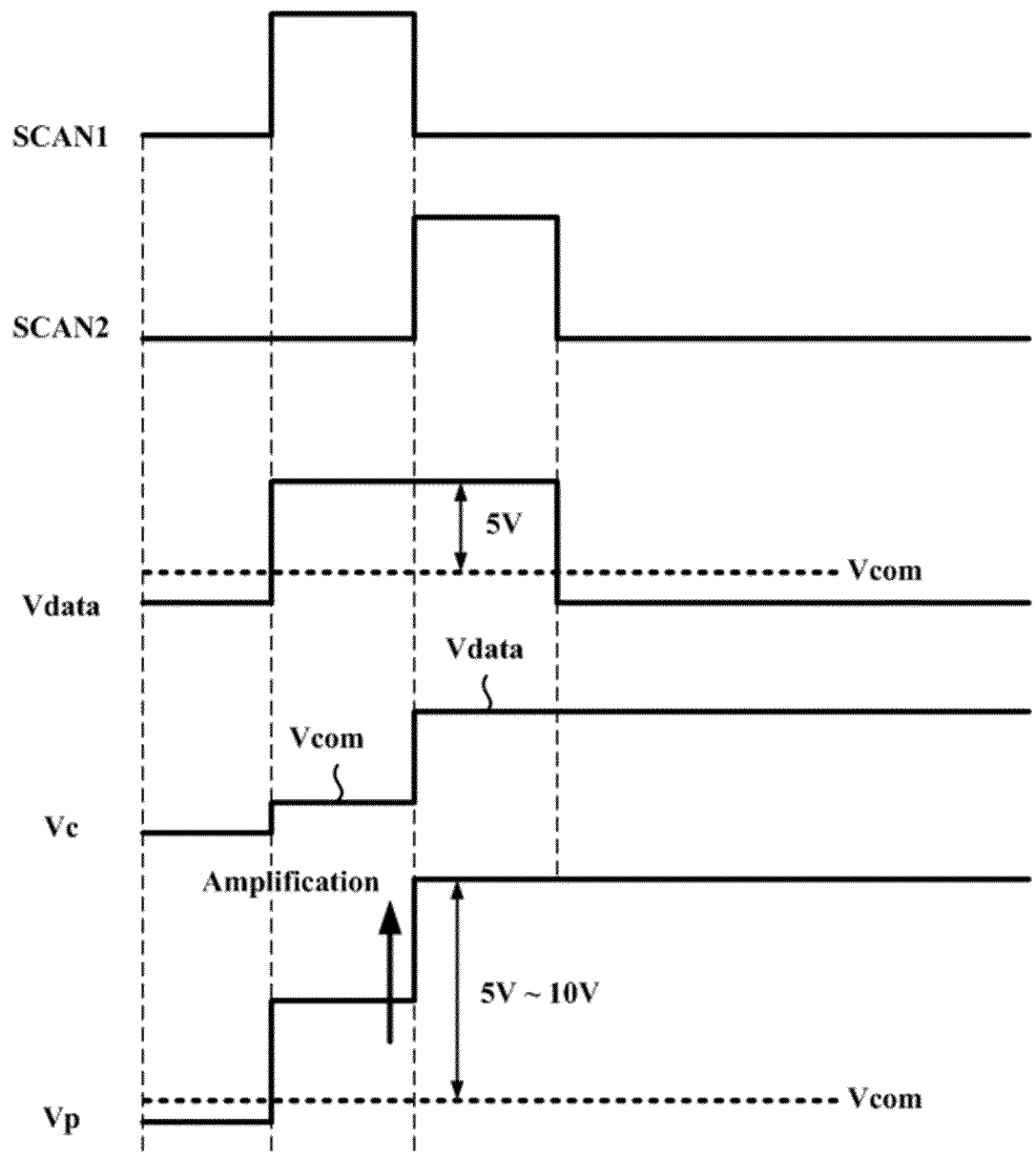

The data driver 4 operates, based on the data control signal DCS supplied from the timing controller 8. The data driver 4 converts image data RGB supplied from the timing controller 8 into data voltage Vdata, using an analog gamma voltage, and supplies the converted data voltage Vdata to the data lines DL. In this case, as shown in FIGS. 4A and 4B, the data driver 4 supplies data voltage Vdata for one horizontal line to the data lines DL in a first period in which the first scan signal SCAN1 is applied to the first gate lines GL1 and in a second period in which the second scan signal SCAN2 is applied to the second gate lines GL2 subsequent to the first period.

The timing controller 8 arranges image data RGB supplied from a system (host), to match the size and resolution of the liquid crystal panel 2, and then supplies the resultant image data RGB to the data driver 4. The timing controller 8 also generates the gate control signal GCS and data control signal DCS, using a plurality of synchronization signals. The synchronization signals include a horizontal synchronization signal Hsync, a vertical synchronization signal Vsync, a dot clock DCLK, a data enable signal DE, etc. The horizontal synchronization signal Hsync is a signal for defining one horizontal period. The vertical synchronization signal Vsync is a signal for defining one frame period. The data enable signal DE is a signal for defining a period in which effective image data RGB of one line is input.

Hereinafter, each pixel P according to the illustrated embodiment and a method for driving the same will be described in detail.

FIG. 2 illustrates the pixel P according to the exemplary embodiment. FIG. 3 is an equivalent circuit diagram of the pixel P illustrated in FIG. 2.

Referring to FIGS. 2 and 3, the pixel P according to the illustrated embodiment includes the first to third TFTs T1 to T3, the pixel electrode 10, the common electrode 12, the auxiliary electrode 14, the first and second storage capacitors Cst1 and Cst2, and the liquid crystal capacitor Clc.

The first TFT T1 is connected to one first gate line GL1, one data line DL, and the pixel electrode 10 (a node N1 in FIG. 3). The first TFT T1 supplies data voltage Vdata supplied from the data line DL to the pixel electrode 10, in response to the first scan signal SCAN1 applied to the first gate line GL1.

The second TFT T2 is connected to the first gate line GL1, a common line CL (a node N3 in FIG. 3), and the auxiliary electrode 14 (a node N2 in FIG. 3). The second TFT T2 supplies a common voltage Vcom supplied from the common line CL, in response to the first scan signal SCAN1 applied to the first gate line GL1.

The third TFT T3 is connected to the second gate line GL2, data line DL, and auxiliary electrode 14 (node N2 in FIG. 3). The third TFT T3 supplies the data voltage Vdata supplied from the data line DL to the auxiliary electrode 14 node N2 in FIG. 3), in response to the second scan signal SCAN2 applied to the second gate line GL2.

The pixel electrode 10 (node N1 in FIG. 3) is connected to a drain electrode of the first TFT T1 via a contact hole (not shown). The pixel electrode 10 may be made of a transparent conductive material such as indium tin oxide (ITO) or indium zinc oxide (IZO).

The common electrode 12 (node N3 in FIG. 3) is connected to the common line CL, to receive the common voltage Vcom from the common line CL. The common electrode 12 is made of the same material as that of the first and second gate lines GL1 and GL2, and is formed on the same layer as the layer on which the first and second gate lines GL1 and GL2 are formed. Thus, the common electrode 12 establishes a horizontal electric field, together with the pixel electrode 10. Alternatively, the common electrode 12 may be formed on an upper substrate of the liquid crystal panel 2, to establish a vertical electric field, together with the pixel electrode 10.

The auxiliary electrode 14 (node N2 in FIG. 3) is connected to drain electrodes of the second and third TFTs T2 and T3. The auxiliary electrode 14 overlaps with the pixel electrode 10 via an insulating layer interposed between the auxiliary electrode 14 and the pixel electrode 10. As will be explained in more detail below with reference to FIGS. 4A and 4B, when the first scan signal SCAN1 is applied, the common voltage Vcom is applied to the auxiliary electrode 14. On the other hand, when the second scan signal SCAN2 is applied, the data voltage Vdata is applied to the auxiliary electrode 14. When the voltage of the auxiliary electrode 14 is varied from the common voltage Vcom to the data voltage Vdata, the data voltage Vdata floated after being applied to the pixel electrode 10 is amplified in accordance with a coupling phenomenon of the first storage capacitor Cst1. That is, the auxiliary electrode 14 functions to amplify the data voltage Vdata floated after being applied to the pixel electrode 10.

The first storage capacitor Cst1 is connected to the pixel electrode 10 and auxiliary electrode 14. The first storage capacitor Cst1 is formed as the pixel electrode 10 and auxiliary electrode 14 overlap with each other via the insulating layer (not shown) interposed between the pixel electrode 10 and auxiliary electrode 14. When the voltage of the auxiliary electrode 14 is varied in accordance with application of the second scan signal SCAN2, the first storage capacitor Cst1 amplifies the floated data voltage Vdata of the pixel electrode 10.

The second storage capacitor Cst2 is connected to the common line CL and auxiliary electrode 14. The second storage capacitor Cst2 is formed as the common line CL and auxiliary electrode 14 overlap with each other via the insulating layer (not shown) interposed between the common line CL and the auxiliary electrode 14. The second storage capacitor Cst2 stabilizes the data voltage Vdata applied to the auxiliary electrode 14 for until the end of one frame period.

The liquid crystal capacitor Clc is connected to the pixel electrode 10 and common electrode 12. More specifically, the liquid crystal capacitor Clc includes the pixel electrode 10 (node N1), the common electrode 12 (node N3), and a liquid crystal layer interposed between the pixel electrode 10 and the common electrode 12. The liquid crystal capacitor Clc varies light transmittance of the liquid crystal layer in accordance with an electric field established between the pixel electrode 10 and the common electrode 12.

FIGS. 4A and 4B are driving waveform diagrams of the pixel P illustrated in FIGS. 2 and 3.

Hereinafter, a method for driving the pixel P in accordance with an exemplary embodiment of the present invention will be described with reference to FIGS. 2 to 4B.

For reference, the data voltage Vdata, which is applied from the data driver 4 to the data line DL, may have a reversible polarity, for reduction of liquid crystal degradation and reduction of flickers. That is, the data voltage Vdata may be a positive (+) voltage with regard to the common voltage Vcom, as shown in FIG. 4A. On the other hand, the data voltage Vdata may be a negative (−) voltage with regard to the common voltage Vcom, as shown in FIG. 4B. Although the cases of FIGS. 4A and 4B are different from each other in terms of polarity, the driving methods thereof are similar. Accordingly, the following description will be given only in conjunction with the case of FIG. 4A.

The data voltage Vdata applied from the data driver 4 to the data line DL is supplied in a first period in which the first scan signal SCAN1 is applied to the first gate line GL1 and in a second period in which the second scan signal SCAN2 is applied to the second gate line GL2 subsequent to the first period. FIG. 4A illustrates an example in which the data voltage Vdata is +5V with regard to the common voltage Vcom.

First, in response to application of the first scan signal SCAN1 from the first gate line GL1 during the first period, the first and second TFTs T1 and T2 are turned on. The first TFT T1 then supplies the data voltage Vdata supplied from the data line DL to the pixel electrode 10 (node N1), whereas the second TFT T2 then supplies the common voltage Vcom supplied from the common line CL to the auxiliary electrode 14 (node N2). Accordingly, the voltage Vp of the pixel electrode 10 becomes 5V, whereas, the voltage Vc of the auxiliary electrode 14 becomes the common voltage Vcom.

Thereafter, the third TFT T3 is turned on in response to application of the second scan signal SCAN2 from the second gate line GL2 during the second period subsequent to the first period. The third TFT T3 then supplies the data voltage Vdata from the data line DL to the auxiliary electrode 14. Accordingly, the voltage Vc of the auxiliary electrode 14 is varied from the common voltage Vcom to 5V that is the data voltage Vdata. When the voltage Vc of the auxiliary electrode 14 is varied to the data voltage Vdata, the data voltage Vdata floated after being applied to the pixel electrode 10 is amplified in accordance with a coupling phenomenon of the first capacitor Cst1 and, as such, has a higher level than 5V. In this case, the amplification level of the voltage Vp of the pixel electrode 10 may be adjustable in accordance with the capacitance ratio between the liquid crystal capacitor Clc and the first storage capacitor Cst1. If the capacitance of the first storage capacitor Cst1 is sufficiently greater than the capacitance of the liquid crystal capacitor Clc, the amplified voltage of the pixel electrode 10 may be about 2 times the data voltage Vdata. In this regard, it is preferred that the first and second storage capacitors Cst1 and Cst2 be designed such that the capacitance of the first storage capacitor Cst1 is greater than the capacitance of the liquid crystal capacitor Clc.

Meanwhile, the second storage capacitor Cst2 stabilizes the data voltage Vdata applied to the auxiliary electrode 14 from the second period to the end of one frame period until the next first scan signal SCAN1 is applied.

As apparent from the above description, in accordance with the embodiment of the present invention, each pixel P is connected to two gate lines GL1 and GL2 and one data line DL. Each pixel P also includes three TFTs T1 to T3, two storage capacitors Cst1 and Cst2, and one auxiliary electrode 14. As the voltage of the auxiliary electrode 14 is varied from the common voltage Vcom to the data voltage Vdata, the data voltage Vdata floated after being supplied to the pixel electrode 10 is amplified in accordance with the capacitance ratio between the liquid crystal capacitor Clc and the storage capacitor Cst1. Accordingly, it may be possible to decrease the level of the data voltage Vdata itself applied from the data driver 4 to the data line DL, and thus reduce power consumption and heat generation of the data driver 4.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A liquid crystal display device comprising:
   a first switching element for supplying a data voltage supplied from a data line to a pixel electrode in response to a first scan signal applied to a first gate line during a first period;
   a second switching element for supplying a common voltage supplied from a common line to an auxiliary electrode in response to the first scan signal during the first period;
   a third switching element for supplying the data voltage supplied from the data line to the auxiliary electrode in response to a second scan signal applied to a second gate line during a second period subsequent to the first period;
   a common electrode to which the common voltage from the common line is applied;
   a liquid crystal capacitor coupled between the pixel electrode and the common electrode; and
   a first storage capacitor coupled between the pixel electrode and the auxiliary electrode,
   wherein a voltage at the auxiliary electrode changes from the common voltage during the first period to the data voltage during the second period, and a voltage at the pixel electrode changes from the data voltage during the first period to an amplified data voltage higher than the data voltage during the second period in accordance with a capacitance ratio between the liquid crystal capacitor and the first storage capacitor.

2. The liquid crystal display device according to claim 1, wherein the common electrode establishes a vertical electric field, together with the pixel electrode.

3. The liquid crystal display device according to claim 1, wherein the common electrode establishes a horizontal electric field, together with the pixel electrode.

4. The liquid crystal display device according to claim 1, wherein the pixel electrode and the auxiliary electrode overlap with each other via an insulating layer interposed between the pixel electrode and the auxiliary electrode, to form the first storage capacitor.

5. The liquid crystal display device according to claim 1, further comprising a second storage capacitor coupled between the common electrode and the auxiliary electrode, the second storage capacitor stabilizing the data voltage applied to the auxiliary electrode from the second period to the end of one frame period.

6. The liquid crystal display device according to claim 5, wherein the common line and the auxiliary electrode overlap with each other via an insulating layer interposed between the common line and the auxiliary electrode, to form the second storage capacitor.

7. The liquid crystal display device according to claim 1, wherein the auxiliary electrode is formed on a layer on which the data line is formed, using a material identical to a material of the data line.

8. A method for driving a liquid crystal display device, the method comprising:
   applying a common voltage supplied from a common line to an auxiliary electrode during a first period in response to a first scan signal applied to a first gate line;
   supplying a data voltage supplied from a data line to a pixel electrode during the first period; and
   supplying the data voltage supplied from the data line to the auxiliary electrode during a second period subsequent to the first period in response to a second scan signal applied to a second gate line,
   wherein a voltage at the pixel electrode changes from the data voltage during the first period to an amplified data voltage higher than the data voltage during the second period in accordance with a capacitance ratio between a liquid crystal capacitor and a first storage capacitor, the liquid crystal capacitor coupled between the pixel electrode and the common electrode, and the first storage capacitor coupled between the pixel electrode and the auxiliary electrode.

9. The method according to claim 8, further comprising:
   stabilizing the data voltage applied to the auxiliary electrode from the second period to the end of one frame period, using a second storage capacitor coupled between the common electrode and the auxiliary electrode.

* * * * *